United States Patent [19]

Butler et al.

[11] Patent Number: 5,522,698
[45] Date of Patent: Jun. 4, 1996

[54] BRUSH SEAL SUPPORT AND VANE ASSEMBLY WINDAGE COVER

[75] Inventors: Aaron S. Butler, Ledyard; Gregory H. Gernhardt, Old Saybrook, both of Conn.

[73] Assignee: United Technologies Corporation, Hartford, Conn.

[21] Appl. No.: 235,824

[22] Filed: Apr. 29, 1994

[51] Int. Cl.$^6$ ................................................. F01D 11/00
[52] U.S. Cl. ........................... 415/170.100; 415/174.5; 277/53
[58] Field of Search ................. 415/170.1, 174.2, 415/174.5; 277/53, 55, 56

[56] References Cited

U.S. PATENT DOCUMENTS

| 885,032 | 4/1908 | De Ferranti | 277/53 |
|---|---|---|---|
| 4,218,189 | 8/1980 | Pask | 277/56 X |
| 4,411,594 | 10/1983 | Pellow et al. | 415/174.2 |
| 4,415,309 | 11/1983 | Atterbury | 415/174.2 |
| 5,114,159 | 5/1992 | Baird et al. | 415/174.2 X |
| 5,174,582 | 12/1992 | Ferguson | 415/174.5 |
| 5,181,728 | 1/1993 | Stec | 415/174.5 X |

Primary Examiner—F. Daniel Lopez
Assistant Examiner—Michael S. Lee

[57] ABSTRACT

A seal support for a brush seal used between a turbine nozzle assembly and a rotor assembly includes a cover plate portion and a support arm. Various construction details are developed that provide a lightweight support for a brush seal and a windage cover. In a particular embodiment, the seal support includes a cover plate portion having circumferentially continuous surfaces to reduce windage losses and a support arm extending inward over a brush seal. In the installed condition, the seal support is positioned to engage the turbine nozzle assembly in an interference fit to dampen the seal support. In another particular embodiment, the support arm has scalloped corners that mate with corners of adjacent seal supports to define an opening. The opening is located to permit cooling fluid to flow through a metering hole and into a cavity to purge the cavity of gas path fluid.

3 Claims, 3 Drawing Sheets

BRUSH SEAL SUPPORT AND VANE ASSEMBLY WINDAGE COVER

TECHNICAL FIELD

The present invention relates to gas turbine engines, and more particularly to a support for a brush seal of a turbine vane assembly.

BACKGROUND OF THE INVENTION

A development in the field of gas turbine engines is the use of brush seals to provide a sealing mechanism between adjacent cavities. Brush seals include one or more rows of bristles sandwiched between a backing plate extending nearly the length of the bristles and a shorter front plate. The densely packed bristles engage a rotating surface to discourage fluid flow between the brush seal and the engaged surface.

Brush seals provide an advantage over other conventional seals, such as knife edge seals in many applications. The brush seals are relatively inexpensive, lightweight and provide continued sealing as they wear. In addition, if excessive wear occurs, the brush seals are relatively inexpensive to replace.

In typical applications, the sandwiched brush seals are loosely mounted between a stationary surface and a sheet metal clamp. During operation, high pressure fluid within one cavity presses the bristles against the backing plates and the forces generated by the pressure differential are reacted by the support surface. In this way the dense packing of the bristles is maintained. The sheet metal clamp keeps the brush seal in place during non-operational conditions but provides little or no support during operation.

Unfortunately, the need for a support surface may negate the ability to use brush seals in applications where there is no available structure to mount the brush seal against. This situation may occur if the lower pressure cavity is on the same side as the rotating components. Using the rotating components to provide the support surface is impractical and would rapidly degrade the brush seal.

The above art notwithstanding, scientists and engineers under the direction of Applicants' Assignee are working to develop effective uses of brush seals in gas turbine engines.

DISCLOSURE OF THE INVENTION

According to the present invention, a seal support for a vane assembly includes an integral cover plate portion and a seal support arm. The cover plate portion includes a flow surface that extends over the adjacent vane assembly to which the seal support is attached. In an installed condition, the flow surface faces into a cavity between the vane assembly and an axially adjacent rotor assembly. The seal support arm extends from the cover plate portion and is adapted to provide support for a brush seal.

As a result of having the support arm extending from the cover plate portion, a brush seal may be used to discourage fluid flow between the cavity and an adjacent cavity having a supply of bypass air. The present invention is particularly advantageous when used with a first stage vane assembly to provide support for a brush seal to prevent or minimize fluid flow of high pressure bypass air through the seal. In this application, the forces on the brush seal exceed the ability of conventional sheet metal supports. In addition, there is a lack of available structure on the low pressure side of the brush seal to support the brush seal against the high pressure bypass air. The seal support extends inward from the cover plate portion to provide the necessary backing and, further, is shaped such that in an installed condition an interference fit between the seal support and the adjacent turbine nozzle assembly is produced. This interference fit provides damping of the seal support, and specifically the support arm.

A further feature of the present invention is the flow surface that faces inward toward the cavity and extends radially inward and over the brush seal. The flow surface, in conjunction with a plurality of circumferentially adjacent seal supports, defines a circumferentially extending flow surface for the cavity that results in minimal windage losses within the cavity.

In a particular embodiment, the support arm of the seal support includes scalloped corners that mate with the scalloped corners of adjacent seal supports. As a result of the scalloped corners, the weight of the seal support is reduced without affecting the ability to provide the necessary support for the brush seals. In another particular embodiment, the turbine nozzle assembly includes a metering hole for flowing high pressure bypass air through. The mating, scalloped corners of the seal supports define an opening between the metering holes and the cavity. As a result, this arrangement provides bypass air into the cavity to purge the cavity of hot gases that may flow into the cavity from the flow path.

The foregoing and other objects, features and advantages of the present invention become more apparent in light of the following detailed description of the exemplary embodiments thereof, as illustrated in the accompanying drawings.

BEST MODE CONTEMPLATED FOR CARRYING OUT THE INVENTION

Figure 1:
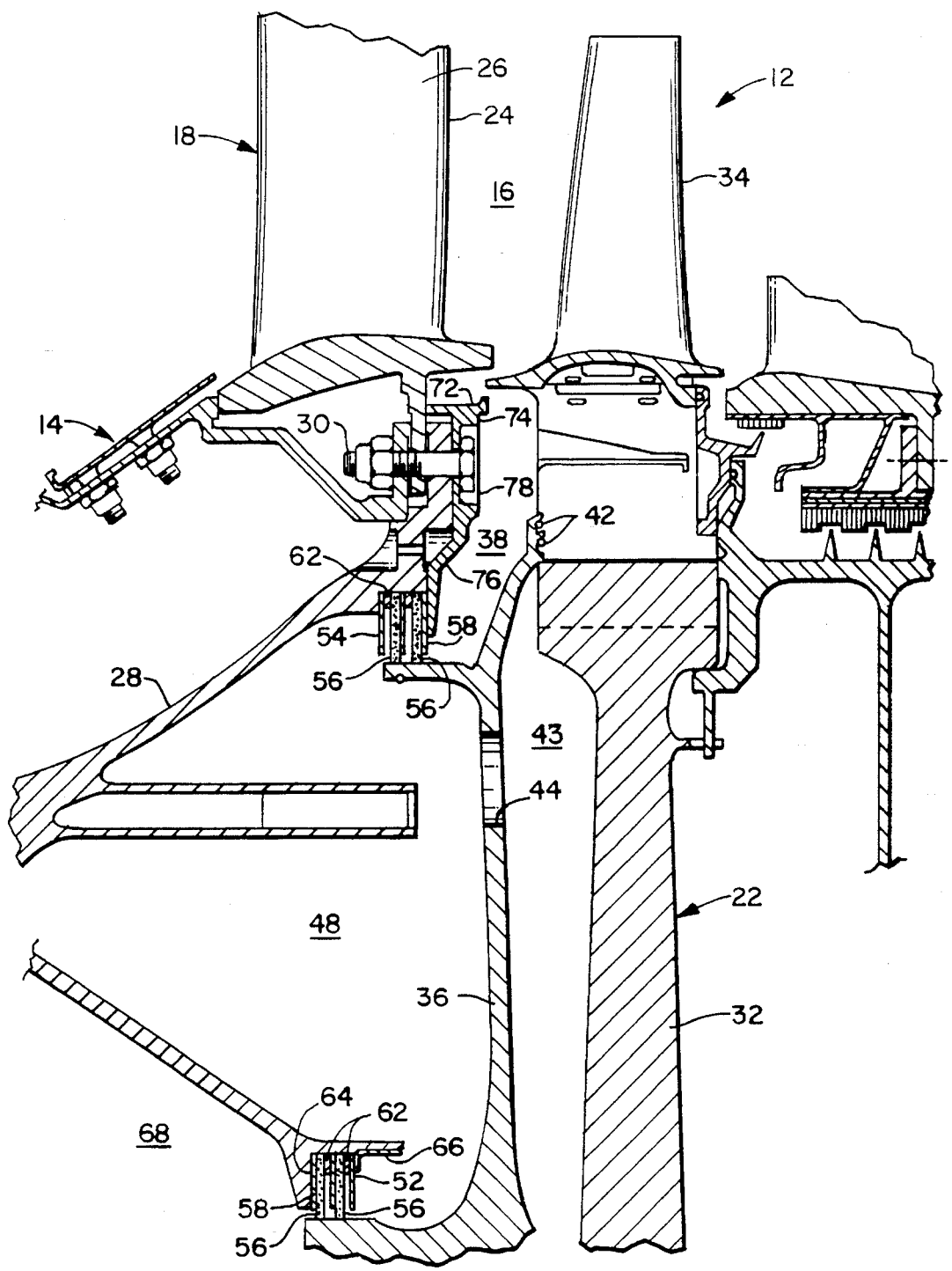
FIG. 1 is a side view of a turbine showing a first stage rotor assembly and a first stage vane assembly having a seal support.

Illustrated in FIG. 1 is a turbine 12 located downstream of a combustor 14 relative to the direction of flow through a flow path 16. Between the turbine 12 and the combustor 14 is a turbine nozzle assembly 18. The turbine 12 includes a rotor assembly 22 disposed about an engine longitudinal axis (not shown). The turbine nozzle assembly 18 includes a vane assembly 24 having a plurality of vanes 26 extending through the flow path 16 and a tangential on-board injector 28 (TOBI). The vanes 26 are attached to the turbine nozzle assembly 18 by a mechanical fastener 30.

The rotor assembly 22 includes a rotating disk 32, a plurality of blades 34 attached to the disk 32 and extending through the flow path 16, and a free standing sideplate or TOBI pump 36 extending over the axially forward surface of the disk 32. A cavity 38 is defined by the axial separation between the stationary turbine nozzle assembly 18 and the rotating rotor assembly 22. The body of fluid within this annular cavity flows circumferentially as a result of the rotation of the rotor assembly. The sideplate 36 also includes an aperture 44 in the web of the sideplate 36 to permit cooling fluid to flow through and into a cavity 43. The sideplate 36 includes a seal 42 to block the flow of fluid from the cavity 43 between the disk 32 and sideplate 36 into the cavity 38. Cooling fluid exits the cavity 43 by flowing through passages (not shown) in the rotor assembly 22 and through the plurality of rotor blades 34 to cool the rotor blades 34.

The cooling fluid is compressor fluid which bypasses the combustion process within the combustor 14 and flows through the TOBI. Fluid exiting the TOBI 46 flows into a second cavity 48 and then through the apertures 44 and into cavity 43. The second cavity 48 is defined by the separation between the turbine nozzle assembly 18 and the sideplate 36 and is sealed by an inner brush seal 52 and an outer brush seal 54. The brush seals 52,54 block fluid communication between the second cavity 48 and the adjacent cavities to prevent loss of cooling fluid.

Figure 4:
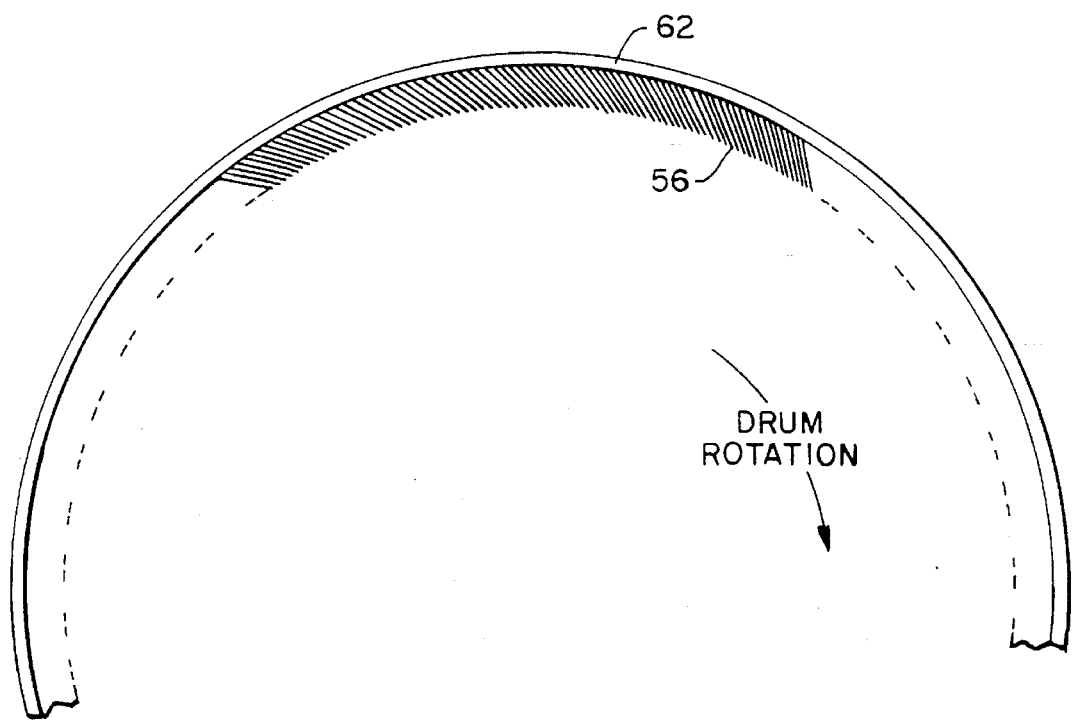
FIG. 4 is an axial view of a portion of a brush seal.

The brush seals 52,54 a pair of circumferentially extending arrays of densely packed bristles 56, each sandwiched between a backing plate 58 and a front plate 62. An axial view of the arrays of bristles 56 is shown in FIG. 4. The inner brush seal 52 is supported in a conventional manner by a surface 64 of the turbine nozzle assembly 18 and is held in place by a sheet metal clamp 66. The surface 64 supports the brush seal 52 against the forces resulting from the differential pressure existing between the second cavity 48 and the adjacent cavity 68. In this configuration, the turbine nozzle assembly 18 provides a convenient surface to react the forces caused by the differential pressure.

The outer brush seal 54, however, is subject to a differential pressure producing a force directed generally downstream and towards the rotating components of the rotor assembly 22. In this configuration, there is no convenient surface to provide sufficient support to the brush seal 54 and a seal support 72 is disposed on the vane assembly 18 to provide this function.

The seal support 72 is a segmented structure that extends circumferentially over the downstream surface of the vane assembly 18 and includes a cover plate portion 74 and a support arm 76. The cross-sectional shape of the seal support 72 conforms to the adjacent shape of the turbine nozzle assembly 18 to maintain adequate clearance from the rotating components.

Figure 2:
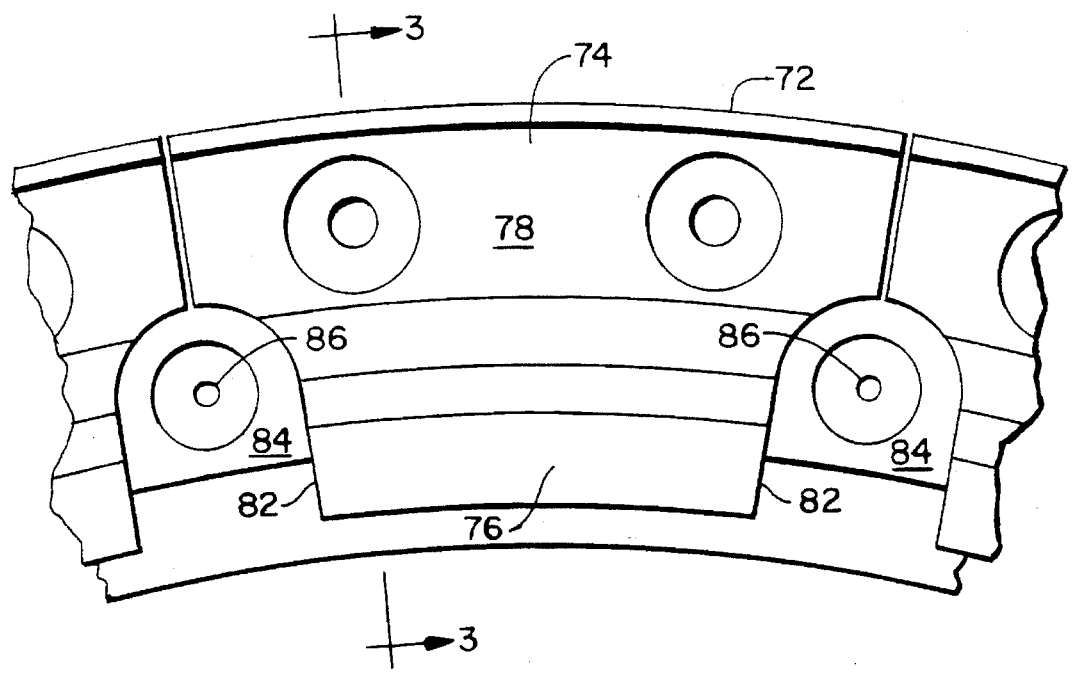
FIG. 2 is a front view of the seal support.
Figure 3:
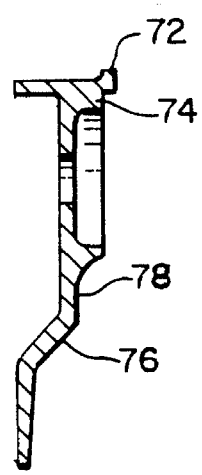
FIG. 3 is a sectioned side view of the seal support taken along line 3—3 of FIG. 2.

The cover plate portion 74 engages the mechanical fastener 30 to attach the seal support 72 to the vane assembly 18. As shown in FIGS. 2 and 3, the seal support 72 has a flow surface 78 that, in conjunction with the adjacent seal supports, is generally continuous in the circumferential direction. The flow surface 78 provides means to reduce windage losses within the cavity 38 as compared to an uncovered vane assembly.

The support arm 76 extends from the cover plate portion 74 and radially inward over the brush seal 54. The seal support 72 is attached to the vane assembly 18 such that an interference fit is developed between the support arm 76 and the turbine nozzle assembly 18. The interference fit dampens the seal support 72 to prevent vibration damage during operation.

The support arm 76 includes corners 82 that are scalloped such that the corners of adjacent seal supports define an opening 84. The opening 84 is positioned to be adjacent to a metering hole 86 extending through the vane assembly 18. The metering hole 86 provides a controlled amount of fluid flow into the cavity 38 to purge the cavity 38 of flow path 16 gases that may flow into the cavity 38. Although the purging flow through the metering holes 86 may not be required in all applications, the scalloped corners 82 produce the additional benefit of reducing the weight of the seal support 72 without sacrificing the ability to provide the necessary support for the brush seal 54.

During operation, the working fluid flowing through the flow path 16 engages the blades 34 causing the rotor assembly 22 to rotate about the longitudinal axis. Cooling fluid from the compressor is flowed around the combustion process and through the TOBI 46 and into the second cavity 48. The fluid pressure within the cavity 48 urges the retained brush seals 52,54, which are loosely mounted in the axial direction, to seat against their respective support surfaces 64,76. The high pressure of the cooling fluid within the cavity 48 is reacted by the stator assembly surface 64 for the inner brush seal 52 and the seal support 72 for the outer brush seal 54. The brush seals 52,54 engage extensions of the sideplate 36 to prevent the fluid within the cavity 48 from flowing into the adjacent cavities 38,68 and urges this fluid to flow through the apertures 44 and into the cavity 43.

Hot gases from the flow path 16 may flow into the cavity 38 and result in excessive heating of this cavity 38. The metering hole 86 may be used to flow a controlled amount of cooling fluid into the is sealed cavity 38. Since the cooling fluid is at a higher pressure than the fluid within the cavity 38 or flow path 16, this cooling fluid purges the cavity 38 of the gas path fluid and maintains the temperature of this cavity 38 within acceptable limits.

Although the invention has been shown and described with respect with exemplary embodiments thereof, it should be understood by those skilled in the art that various changes, omissions, and additions may be made thereto, without departing from the spirit and scope of the invention.

What is claimed is:

1. A seal support for a turbine section of a gas turbine engine, the gas turbine engine being disposed about a longitudinal axis and including a turbine nozzle assembly having a vane assembly, the turbine section including a rotor assembly disposed axially downstream of the vane assembly, the vane assembly including a vane attached to the turbine nozzle assembly by a fastener, wherein the axial separation between the vane assembly and the rotor assembly defines a cavity therebetween, the cavity defining the flow surfaces for an annular body of fluid flowing circumferentially, the cavity being sealed in part by a brush seal supported by the seal support, the seal support including:

a cover plate portion having means to engage the vane to attach the brush seal support to the vane, wherein in an installed condition the cover plate portion provides a flow surface extending over a portion of the vane assembly to thereby minimize windage losses within the cavity; and a support arm extending from the cover plate, wherein in the installed condition the support arm provides axially directed support for the brush seal during operation of the gas turbine engine, said support arm including at least one opening of fixed cross sectional area, therein adapted to permit fluid to flow through the brush seal support arm and into the cavity to purge the cavity.

2. The seal support according to claim 1, further including a scalloped corner, wherein the vane assembly includes a plurality of brush seal supports circumferentially adjacent to each other, and wherein the opening is defined by the scalloped corner in conjunction with a scalloped corner of an adjacent brush seal support.

3. The seal support according to claim 1, wherein the brush seal support is adapted to deflect in the installed condition to provide an interference fit between the seal support and the turbine nozzle assembly such that the seal support is dampened.

\* \* \* \* \*